United States Patent
Pek

(10) Patent No.: US 11,465,644 B2
(45) Date of Patent: Oct. 11, 2022

(54) MOVEMENT PLANNING BY MEANS OF INVARIANTLY SAFE STATES OF A MOTOR VEHICLE

(71) Applicant: Bayerische Motoren Werke Aktiengesellschaft, Munich (DE)

(72) Inventor: Christian Pek, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 124 days.

(21) Appl. No.: 16/971,980

(22) PCT Filed: Apr. 2, 2019

(86) PCT No.: PCT/DE2019/100302
§ 371 (c)(1),
(2) Date: Aug. 21, 2020

(87) PCT Pub. No.: WO2019/196985
PCT Pub. Date: Oct. 17, 2019

(65) Prior Publication Data
US 2020/0398863 A1 Dec. 24, 2020

(30) Foreign Application Priority Data
Apr. 9, 2018 (DE) .................... 10 2018 205 242.5

(51) Int. Cl.
*B60W 60/00* (2020.01)
*B60W 30/09* (2012.01)
*B60W 50/00* (2006.01)

(52) U.S. Cl.
CPC ........ *B60W 60/0011* (2020.02); *B60W 30/09* (2013.01); *B60W 50/0097* (2013.01);
(Continued)

(58) Field of Classification Search
None
See application file for complete search history.

(56) References Cited

U.S. PATENT DOCUMENTS

2012/0143488 A1* 6/2012 Othmezouri ........... G06V 20/58
701/301
2015/0344030 A1* 12/2015 Damerow ......... B60W 30/0956
701/1
(Continued)

FOREIGN PATENT DOCUMENTS

DE        103 35 898 A1    3/2005
DE  10 2004 057 603 A1    4/2006
(Continued)

OTHER PUBLICATIONS

Althoff, M., "Reachability Analysis and its Application to the Safety Assessment of Autonomous Cars", Jan. 3, 2018, https://mediatum.ub.tum.de/doc963752/642175.pdf XP055587085, (221 Pages).
(Continued)

*Primary Examiner* — James J Lee
*Assistant Examiner* — Wenyuan Yang
(74) *Attorney, Agent, or Firm* — Crowell & Moring LLP

(57) ABSTRACT

A driver assistance system plans movement for a motor vehicle, wherein a safe state of the motor vehicle is a state of the motor vehicle in a first time step from which the motor vehicle can be transferred, as a function of a movement capability of the motor vehicle in at least one second time step which follows the first time step, into a further safe state without colliding with a road user. The driver assistance system is configured to determine for at least one future time step starting from a current state of the motor vehicle, at least one possible future state of the motor vehicle and of the road user, and to select safe future states of the motor vehicle (Continued)

from the possible future states of the motor vehicle and of the road user, and to plan a movement for the motor vehicle as a function of the safe future states.

10 Claims, 2 Drawing Sheets

(52) U.S. Cl.
CPC .... *B60W 60/0016* (2020.02); *B60W 60/0017* (2020.02); *B60W 60/0027* (2020.02); *B60W 2520/06* (2013.01); *B60W 2520/10* (2013.01); *B60W 2554/404* (2020.02); *B60W 2554/80* (2020.02)

(56) References Cited

U.S. PATENT DOCUMENTS

| | | | | |
|---|---|---|---|---|
| 2016/0059855 | A1* | 3/2016 | Rebhan | B60W 30/0956 701/41 |
| 2017/0212513 | A1* | 7/2017 | Iida | B60W 50/02 |
| 2018/0281785 | A1* | 10/2018 | Berntorp | G08G 1/161 |
| 2019/0056735 | A1* | 2/2019 | Koopman | G05D 1/0077 |
| 2020/0189574 | A1* | 6/2020 | Vignard | B60W 60/0015 |

FOREIGN PATENT DOCUMENTS

| | | |
|---|---|---|
| DE | 10 2012 200 431 A1 | 7/2013 |
| DE | 10 2014 216 314 A1 | 2/2016 |
| DE | 10 2015 206 335 A1 | 10/2016 |
| EP | 3 178 715 A1 | 6/2017 |
| WO | WO 2017/155598 A2 | 9/2017 |

OTHER PUBLICATIONS

International Search Report (PCT/ISA/210) issued in PCT Application No. PCT/DE2019/100302 dated Jun. 12, 2019 with English translation (six (6) pages).

German-language Written Opinion (PCT/ISA/237) issued in PCT Application No. PCT/DE2019/100302 dated Jun. 12, 2019 (seven (7) pages).

German-language Search Report issued in German Application No. 10 2018 205 242.5 dated Sep. 26, 2018 with partial English translation (12 pages).

* cited by examiner ized driving" may be understood to mean driving with automated longitudinal or lateral guidance, or autonomous driving with automated longitudinal and lateral guidance. The term "automated driving" encompasses automated driving with an arbitrary degree of automation. Exemplary degrees of automation are assisted, partially automated, highly automated or fully automated driving. These degrees of automation were defined by the *Bundesanstalt für Straßenwesen* [German Federal Highway Research Institute—BASt] (see BASt publication entitled *Research Compact*, Edition November 2012). In the case of assisted driving, the driver permanently performs the longitudinal or lateral guidance while the system takes over the respective other function within certain limits. In the case of partially automated driving (PAD), the system takes over the longitudinal and lateral guidance for a certain period of time and/or in specific situations, in which connection the driver has to monitor the system permanently, as in the case of assisted driving. In the case of highly automated driving (HAD), the system takes over the longitudinal and lateral guidance for a certain period of time, without the driver having to monitor the system permanently; but the driver has to be capable of taking over the guidance of the vehicle within a certain time. In the case of fully automated driving (FAD), the system can automatically manage the driving in all situations for a specific application; a driver is no longer required for this application. The four degrees of automation stated above, according to the definition given by BASt, correspond to SAE Levels 1 to 4 of standard SAE J3016 (SAE=Society of Automotive Engineers). For instance, highly automated driving (HAD) corresponds, according to BASt, to Level 3 of standard SAE J3016. Furthermore, in SAE J3016, SAE Level 5 is provided as the highest degree of automation, which is not included in the definition given by BASt. SAE Level 5 corresponds to driverless driving, in the course of which the system can manage all situations automatically during the entire trip like a human driver; a driver is generally no longer required.

MOVEMENT PLANNING BY MEANS OF INVARIANTLY SAFE STATES OF A MOTOR VEHICLE

BACKGROUND AND SUMMARY OF THE INVENTION

The invention relates to a driver-assistance system and a method for movement planning by means of invariantly safe states of a motor vehicle, and also to a driver-assistance system for verifying a trajectory by means of invariantly safe states of the motor vehicle.

Within the context of this document, the term "automated driving" may be understood to mean driving with automated longitudinal or lateral guidance, or autonomous driving with automated longitudinal and lateral guidance. The term "automated driving" encompasses automated driving with an arbitrary degree of automation. Exemplary degrees of automation are assisted, partially automated, highly automated or fully automated driving. These degrees of automation were defined by the *Bundesanstalt für Straßenwesen* [German Federal Highway Research Institute—BASt] (see BASt publication entitled *Research Compact*, Edition November 2012). In the case of assisted driving, the driver permanently performs the longitudinal or lateral guidance while the system takes over the respective other function within certain limits. In the case of partially automated driving (PAD), the system takes over the longitudinal and lateral guidance for a certain period of time and/or in specific situations, in which connection the driver has to monitor the system permanently, as in the case of assisted driving. In the case of highly automated driving (HAD), the system takes over the longitudinal and lateral guidance for a certain period of time, without the driver having to monitor the system permanently; but the driver has to be capable of taking over the guidance of the vehicle within a certain time. In the case of fully automated driving (FAD), the system can automatically manage the driving in all situations for a specific application; a driver is no longer required for this application. The four degrees of automation stated above, according to the definition given by BASt, correspond to SAE Levels 1 to 4 of standard SAE J3016 (SAE=Society of Automotive Engineers). For instance, highly automated driving (HAD) corresponds, according to BASt, to Level 3 of standard SAE J3016. Furthermore, in SAE J3016, SAE Level 5 is provided as the highest degree of automation, which is not included in the definition given by BASt. SAE Level 5 corresponds to driverless driving, in the course of which the system can manage all situations automatically during the entire trip like a human driver; a driver is generally no longer required.

It is an object of the invention to provide a driver-assistance system and a method for movement planning by means of invariantly safe states of a motor vehicle, and a driver-assistance system for verifying a trajectory by means of invariantly safe states of the motor vehicle.

The object is achieved by the features of the independent claims. Advantageous embodiments are described in the dependent claims. Attention is drawn to the fact that additional features of a claim dependent on an independent claim without the features of the independent claim or only in combination with a subset of the features of the independent claim may constitute a separate invention that is independent of the combination of all the features of the independent claim and that may be made the subject of an independent claim, of a divisional application or of a subsequent application. This holds in like manner for technical teachings described in the description, which may constitute an invention that is independent of the features of the independent claims.

A first aspect of the invention relates to a driver-assistance system for movement planning for a motor vehicle. The movement planning encompasses, for instance, the planning of a trajectory for the motor vehicle or the planning of a target speed for the motor vehicle. A planned movement for the motor vehicle may then be preset, in particular by the driver-assistance system, for at least one actuator of the motor vehicle, for instance a propulsion system or a steering system, so that an at least partially automated operation arises. Alternatively, a driver of the motor vehicle may be informed of the planned movement by means of at least one output device, for instance for acoustic or visual output, so that the driver can carry out the planned movement manually by actuating the steering, the accelerator and/or the brake pedal.

A safe state of the motor vehicle is a state of the motor vehicle in a first time-step, from which, depending on a motivity of the motor vehicle in at least a second time-step which follows the first time-step, the motor vehicle can be transferred into a further safe state without colliding with a road-user.

The perception underlying the invention is that a safe state differs from a state that is "only" collision-free. A collision-free state is a state in which there is no collision of the motor vehicle with a road-user. In this case the temporal dimension of the traffic situation is not considered. Instead, the implicit assumption underlying the consideration of a collision-free state is that the motor vehicle and the road-user collide at a certain point in time or alternatively do not collide. In connection with the consideration of safe states, additional movements, possible in future, of the motor vehicle and of the road-user are considered. A safe state is, for instance, a state in which the motor vehicle can prevent a collision at least by an evasive and/or braking maneuver in the course of all movements of the road-user that are possible in future, taking its own motilities into account. It consequently holds true that a safe state is, at any rate, also a collision-free state. However, not every collision-free state is also a safe state. For instance, a state in which the motor vehicle is located only a very short distance from the road-user and at the same time has a very high differential speed is indeed collision-free, since no collision has occurred so far. However, this state is not safe, since a collision in a future time-step is unavoidable.

The motivity of the motor vehicle is preset, in particular, by physical parameters of the motor vehicle and of the environment of the motor vehicle, for instance of the roadway. The motivity can, for instance, be represented by means of a vehicle model.

In particular, the motivity of the motor vehicle encompasses a deceleration that is achievable by the motor vehicle and that results, for instance, from the maximally available braking force, and/or a steering angle that is achievable by the motor vehicle.

In particular, the state of the motor vehicle or of the road-user encompasses a spatial position of the motor vehicle or of the road-user, an acceleration of the motor vehicle or of the road-user, a direction of movement of the motor vehicle or of the road-user, and/or a speed of movement of the motor vehicle or of the road-user.

In addition to this, the driver-assistance system has been configured to determine, for at least one future time-step starting from a current state of the motor vehicle, at least one possible future state of the motor vehicle and of the road-user. In particular, the driver-assistance system may also have been configured to determine sets of possible states of at least one other road-user.

In addition, the driver-assistance system has been configured to select safe future states of the motor vehicle from the possible future states of the motor vehicle and of the road-user, and to plan a movement for the motor vehicle, depending on the safe future states.

The selected set of safe future states may, in particular, be under-approximated, in order to guarantee an efficient selection. By virtue of the under-approximation, a selection of safe states takes place, depending on which a movement for the motor vehicle is planned. Each of these selected safe states is actually a safe state. In addition to this, however, the unselected safe states are considered as unsafe states in connection with the planning of the movement for the motor vehicle. As a result, a trade-off can be obtained between an efficient selection of the safe states and the state space available for the planning of the movement of the motor vehicle.

In an advantageous embodiment, the driver-assistance system encompasses a presettable planning horizon which determines the number of future time-steps for planning the movement. This planning horizon may, for instance, have been implicitly preset by the range of sensors of the motor vehicle. Alternatively or additionally, this planning horizon may, for instance, also have been preset by the computing power of the electronic systems of the motor vehicle. Alternatively or additionally, the planning horizon may also be user-defined—that is to say, it may be preset, for instance by the driver of the motor vehicle or already in the course of development of the driver-assistance system or of the motor vehicle.

A safe state of the motor vehicle is a state of the motor vehicle in a first time-step, from which, depending on the motivity of the motor vehicle in all time-steps of the planning horizon following the first time-step, the motor vehicle can be transferred in each instance at least into a further safe state without colliding with a road-user.

In another advantageous embodiment, the driver-assistance system has been configured to plan the movement for the motor vehicle in such a manner that the motor vehicle is in a safe state at least in a future time-step.

In another advantageous embodiment, the driver-assistance system has been configured to plan an evasive movement for the motor vehicle for at least one possible future state of the motor vehicle and of the road-user, from which, depending on the motivity of the motor vehicle, the motor vehicle cannot be transferred into a safe state without colliding with a road-user. The evasive movement may be, for instance, a steering maneuver and/or braking maneuver.

In another advantageous embodiment, the driver-assistance system has been configured to activate at least one protective system of the motor vehicle when it is ascertained that the vehicle is not in a safe state. The protective system may be, in particular, a "pre-crash" system known from the prior art, such as, for instance, a belt-tensioner or a preconditioning of a braking system of the motor vehicle. In this connection, the perception underlying the invention is that an unsafe state is not necessarily a collision state, since, where appropriate, the safe states were determined by means of an under-approximation. A collision in a future time-step may be possible, however.

As an alternative or in addition to the activation of a protective system, the computing power of the control devices of the motor vehicle may, in particular, also be redistributed. For instance, in the case where the driver-assistance system is operating with an under-approximation of the set of safe future states, more computing power can be provided for a more exact calculation of the set of safe future states by a relocalisation of the processes that are executed in the control devices of the motor vehicle. For instance, the computing power that has been released can also be used for more exact determination of a trajectory.

In another advantageous embodiment, the driver-assistance system encompasses a presettable planning horizon which determines the number of future time-steps for planning the movement. In addition to this, the driver-assistance system has been configured to plan the movement for the motor vehicle in such a manner that the motor vehicle is in a safe state in all time-steps of the planning horizon following the first time-step.

A second aspect of the invention relates to a driver-assistance system for verifying a trajectory for a motor vehicle. A safe state of the motor vehicle is a state of the motor vehicle in a first time-step, from which, depending on a motivity of the motor vehicle in at least a second time-step which follows the first time-step, the motor vehicle can be transferred into a further safe state without colliding with a road-user.

The driver-assistance system has been configured to determine or to accept a trajectory for the motor vehicle, and to determine at least one possible future state of the motor vehicle and of the road-user for at least one future time-step starting from a current state of the motor vehicle.

In addition to this, the driver-assistance system has been configured to select safe future states of the motor vehicle from the possible future states of the motor vehicle and of the road-user, and to determine, depending on the safe future states of the motor vehicle, whether the trajectory transfers the motor vehicle into an unsafe state in at least one future time-step.

A third aspect of the invention relates to a method for movement planning for a motor vehicle, wherein a safe state of the motor vehicle is a state of the motor vehicle in a first time-step, from which, depending on a motivity of the motor vehicle in at least a second time-step which follows the first time-step, the motor vehicle can be transferred into a further safe state without colliding with a road-user.

One step of the method is the determining of at least one possible future state of the motor vehicle and of the road-user for at least one future time-step starting from a current state of the motor vehicle.

A further step of the method is the selecting of safe future states of the motor vehicle from the possible future states of the motor vehicle and of the road-user.

A further step of the method is the planning of a movement for the motor vehicle, depending on the safe future states of the motor vehicle.

The above remarks relating to the driver-assistance system according to the invention as defined by the first aspect of the invention also apply in corresponding manner to the driver-assistance system according to the invention as defined by the second aspect of the invention, and to the method as defined by the third aspect of the invention. Advantageous embodiment examples of the driver-assistance system according to the invention as defined by the second aspect of the invention, and of the method according to the invention as defined by the third aspect of the invention, that are not explicitly described at this point and in the claims correspond to the advantageous embodiment examples of the driver-assistance system according to the invention as defined by the first aspect of the invention that are described above or described in the claims.

The invention will be described below on the basis of an embodiment example with the aid of the enclosed drawings.

DETAILED DESCRIPTION OF THE DRAWINGS

Figure 1:
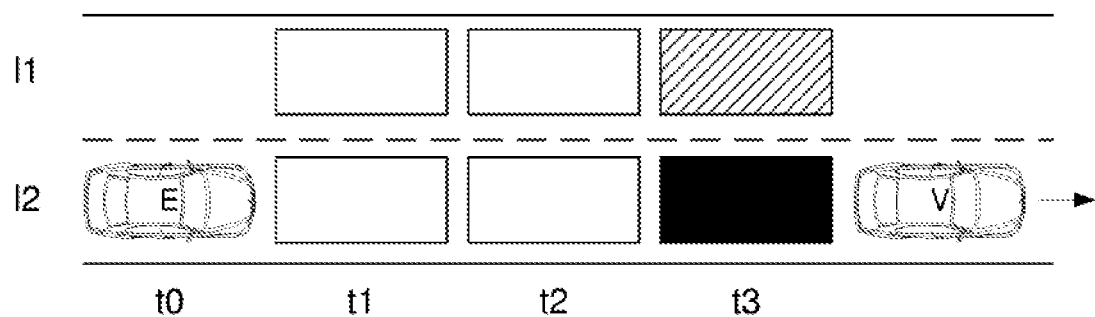
FIG. 1 illustrates an embodiment example of the method according to the invention.

FIG. 1 shows a method for movement planning for a motor vehicle E by means of a driver-assistance system FAS.

A safe state of the motor vehicle E is a state of the motor vehicle E in a first time-step, from which, depending on a motivity of the motor vehicle E in at least a second time-step which follows the first time-step, the motor vehicle E can be transferred into a further safe state without colliding with a road-user V.

The motivity of the motor vehicle E encompasses, for instance, a deceleration that is achievable by the motor vehicle E and/or a steering angle that is achievable by the motor vehicle E.

The state of the motor vehicle E or of the road-user V encompasses, in turn, a spatial position of the motor vehicle E or of the road-user V, an acceleration of the motor vehicle E or of the road-user V, a direction of movement of the motor vehicle E or of the road-user V, and/or a speed of movement of the motor vehicle E or of the road-user V.

One step of the method is the determining of at least one possible future state Z of the motor vehicle E and of the road-user V for at least one future time-step t1, t2, t3 starting from a current state I2;t0 of the motor vehicle E.

The driver-assistance system FAS encompasses a presettable planning horizon which determines the number of future time-steps t1, t2, t3 for planning the movement.

The states result, for instance, from the combination of the future time-steps t1, t2, t3 in each instance with a possible lane I1, I2 for the motor vehicle and/or the road-user. Consequently the set of future states Z for the motor vehicle E consists of states t1;I1, t1;I2, t2;I1, t2;I2, t3;I1 and t3;I2.

A further step of the method is the selecting of safe future states S of the motor vehicle E from the possible future states Z of the motor vehicle E and of the road-user V.

When the motivity of the motor vehicle is taken into account, it follows, for instance, that states t1;I1, t1;I2, t2;I1, t2;I2 of the future states Z are safe states and consequently constitute set S.

The safe future states S are distinguished in that the motor vehicle E can be brought into a safe state again from each of these safe future states S, for instance by a braking maneuver, without colliding with the road-user V.

State t3;I2 in the embodiment example is not safe, since in this state the spatial separation between the motor vehicle E and the road-user V is so small that, depending on the behavior of the road-user V, the motor vehicle E cannot, within the scope of its motivity, avoid a collision under all circumstances. For instance, the differential speed between the motor vehicle E and the road-user V might be so great that in the event of a full braking of the road-user a collision between the motor vehicle E and the road-user V is unavoidable.

State t3;I1 in the embodiment example is indeed collision-free, but it is not safe. Taking the current information status of the motor vehicle E into account, state t3;I1 would be harmless for the motor vehicle E, since the road-user is located in lane I2. However, there is the possibility that the road-user V suddenly changes to lane I1. If in this hypothetical case the motor vehicle were to be in state t3;I1—analogous to state t3;I2—a collision between the motor vehicle E and the road-user V would be unavoidable.

The last step of the method is the planning of a movement for the motor vehicle E, depending on the safe future states S of the motor vehicle E.

The driver-assistance system FAS has been configured to plan the movement for the motor vehicle E in such a manner that the motor vehicle E is in a safe state at least in a future time-step t1, t2, t3.

For instance, a movement for the motor vehicle E might be such that the motor vehicle E approaches the road-user V and then reduces its speed in such a manner that the motor vehicle E follows the road-user V at a safe distance.

Should, for instance, at the request of the driver of the motor vehicle E the motor vehicle E nevertheless wish to overtake the road-user V, it would be necessary that the motor vehicle E passes over for a short time into an unsafe state, for instance into an "only" collision-free state.

In this case, the driver-assistance system FAS may have been configured to plan an evasive movement for the motor vehicle E for at least one possible future state Z of the motor vehicle E and of the road-user V, from which, depending on the motivity of the motor vehicle E, the motor vehicle E cannot be transferred into a safe state S without colliding with a road-user V. The evasive movement for the motor vehicle E may be, for instance, a change of lane onto a shoulder.

In addition to this, the driver-assistance system FAS may have been configured to activate at least one protective system of the motor vehicle E when it is ascertained that the vehicle is not in a safe state S.

Figure 2:
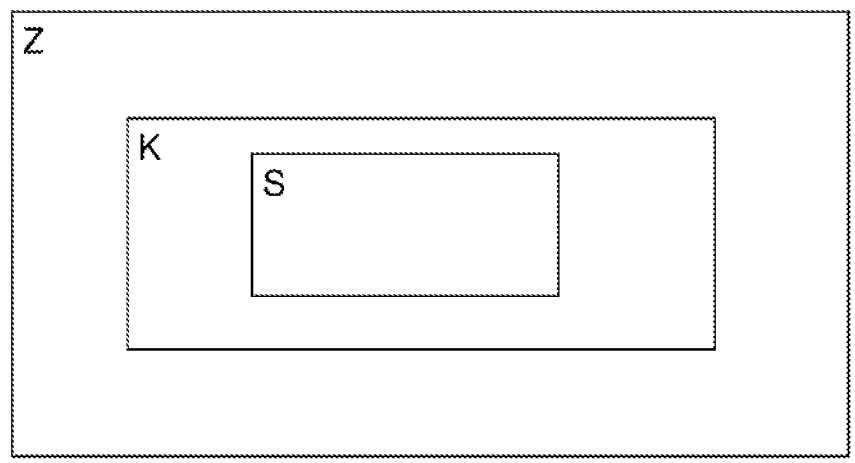
FIG. 2 is a schematic diagram of an exemplary relationship between sets of states.

FIG. 2 shows an exemplary relationship between sets of states. Set of states Z comprises, for instance, all possible future states of the motor vehicle E.

Set of states K, which is a subset of the set Z of all possible future states, comprises all possible future collision-free states of the motor vehicle E, in which the motor vehicle E does not collide with the road-user V.

Set of states S, which is a subset of the set K of all possible future collision-free states of the motor vehicle E, comprises all future safe states of the motor vehicle E, in which the motor vehicle does not collide with the road-user V, for instance over an unbounded time horizon.

Figure 3:
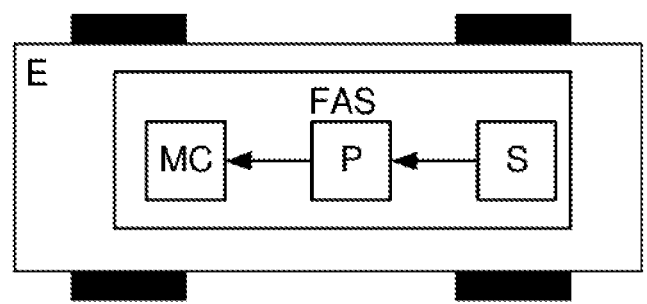
FIG. 3 is a schematic diagram of an embodiment example of the driver-assistance system according to the invention.

FIG. 3 shows an embodiment example of the driver-assistance system FAS according to the invention. The motor vehicle E includes the driver-assistance system FAS.

The driver-assistance system FAS includes a first control unit S which has been configured to determine, for at least one future time-step t1, t2, t3 starting from a current state I2;t0 of the motor vehicle E, at least one possible future state Z of the motor vehicle E and of the road-user V.

In addition to this, the driver-assistance system FAS includes a second control unit P which has been configured to select safe future states S of the motor vehicle E from the possible future states Z of the motor vehicle E and of the road-user V.

In addition, the driver-assistance system FAS includes a third control unit MC which has been configured to plan a movement for the motor vehicle E, depending on the safe future states S.

What is claimed is:

1. A system for movement planning for a motor vehicle, comprising:
a driver assistance system controller configured to:
determine, for at least one future time-step starting from a current state of the motor vehicle, at least one possible future state of the motor vehicle and of a road-user;
select safe future states of the motor vehicle from the possible future states of the motor vehicle and of the road-user; and
plan a movement for the motor vehicle, depending on the safe future states, wherein
a safe state of the motor vehicle is a state of the motor vehicle in a first time-step, from which, depending on a motivity of the motor vehicle in at least a second time-step which follows the first time-step, the motor vehicle is transferrable into a further safe state without colliding with the road-user,
wherein the controller is further configured to:
intentionally enter an unsafe state in at least one time-step, and
reenter a safe state in at least one subsequent time-step; and
wherein the controller is further configured to perform at least one of the following:
cause at least one actuator to perform at least one at least partially automated operation in accordance with the planned movement; or
cause at least one output device to output a notification to indicate the performance of the planned movement by at least one of the controller or a driver.

2. The system according to claim 1, wherein the controller is configured to provide a presettable planning horizon which determines the number of future time-steps for planning the movement, and
wherein a safe state of the motor vehicle is a state of the motor vehicle in a first time-step, from which, depending on the motivity of the motor vehicle in all time-steps of the planning horizon following the first time-step, the motor vehicle is transferrable in each instance at least into a further safe state without colliding with the road-user.

3. The system according to claim 1, wherein the controller is further configured to:
plan the movement for the motor vehicle in such a manner that the motor vehicle is in a safe state at least in a future time-step.

4. The system according to claim 1, wherein the controller is further configured to:
plan an evasive movement for the motor vehicle for at least one possible future state of the motor vehicle and of the road-user, from which, depending on the motivity of the motor vehicle, the motor vehicle cannot be transferred into a safe state without colliding with a road-user.

5. The system according to claim 4, wherein the controller is further configured to:
activate at least one protective system of the motor vehicle when the system ascertains that the vehicle is not in a safe state.

6. The system according to claim 1, wherein the controller is configured to:
provide a presettable planning horizon which determines the number of future time-steps for planning the movement; and
plan the movement for the motor vehicle in such a manner that the motor vehicle is in a safe state in all time-steps of the planning horizon following the first time-step.

7. The system according to claim 1, wherein the state of the motor vehicle or of the road-user encompasses at least one of:
a spatial position of the motor vehicle or of the road-user,
an acceleration of the motor vehicle or of the road-user,
a direction of movement of the motor vehicle or of the road-user, and
a speed of movement of the motor vehicle or of the road-user.

8. The system according to claim 1, wherein the motivity of the motor vehicle encompasses a deceleration that is achievable by the motor vehicle and/or a steering angle that is achievable by the motor vehicle.

9. A system for verifying a trajectory for a motor vehicle, comprising:
a controller configured to:
determine or to accept a trajectory for the motor vehicle;
determine, for at least one future time-step starting from a current state of the motor vehicle, at least one possible future state of the motor vehicle and of the road-user;
select safe future active states of the motor vehicle from the possible future states of the motor vehicle and of the road-user; and
determine, depending on the safe future states of the motor vehicle, whether the trajectory transfers the motor vehicle into an unsafe state in at least one future time-step, wherein a safe state of the motor vehicle is a state of the motor vehicle in a first time-step, from which, depending on a motivity of the motor vehicle in at least a second time-step which follows the first time-step, the motor vehicle is transferrable into a further safe state without colliding with a road-user,
wherein the controller is further configured to:
intentionally enter an unsafe state in at least one time-step, and
reenter a safe state in at least one subsequent time-step; and
wherein the controller is further configured to perform at least one of the following:
cause at least one actuator to perform at least one at least partially automated operation in accordance with the trajectory, or
cause at least one output device to output a notification to indicate the execution of the trajectory by at least one of the controller or a driver.

10. A method for movement planning for a motor vehicle, comprising:
intentionally entering, by request of a driver of the motor vehicle, into an unsafe state as a current state of the motor vehicle;
reentering a safe state in at least one subsequent time-step;
determining, by a controller, at least one possible future state of the motor vehicle and of the road-user for at least one future time-step starting from the current state of the motor vehicle;
selecting, by the controller, safe future states of the motor vehicle from the possible future states of the motor vehicle and of the road-user; and
planning, by the controller, a movement for the motor vehicle, depending on the safe future states of the motor vehicle, wherein the safe state of the motor vehicle is a state of the motor vehicle in a first time-step, from which, depending on a motivity of the motor vehicle in at least a second time-step which follows the first time-step, the motor vehicle can be transferred into a further safe state without colliding with a road-user,
wherein the method further comprises at least one of the following:
  causing, by the controller, at least one actuator to perform at least one at least partially automated operation in accordance with the planned movement; or
  causing, by the controller, at least one output device to output a notification to indicate the performance of the planned movement by at least one of the controller or a driver.

* * * * *